United States Patent
Baum et al.

(10) Patent No.: US 9,174,625 B2
(45) Date of Patent: Nov. 3, 2015

(54) METHOD FOR OPERATING A HYBRID DRIVE

(75) Inventors: Daniel Baum, Aalen (DE); Thomas Rauner, Blaubeuren (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 137 days.

(21) Appl. No.: 12/568,131

(22) Filed: Sep. 28, 2009

(65) Prior Publication Data

US 2010/0146938 A1    Jun. 17, 2010

(30) Foreign Application Priority Data

Dec. 17, 2008  (DE) .................. 10 2008 063 449

(51) Int. Cl.

| | |
|---|---|
| *F01N 3/00* | (2006.01) |
| *B60W 10/06* | (2006.01) |
| *B60K 6/48* | (2007.10) |
| *B60W 10/08* | (2006.01) |
| *B60W 30/192* | (2012.01) |
| *B60W 20/00* | (2006.01) |
| *F01N 9/00* | (2006.01) |

(52) U.S. Cl.
CPC .................. *B60W 10/06* (2013.01); *B60K 6/48* (2013.01); *B60W 10/08* (2013.01); *B60W 30/192* (2013.01); *B60L 2240/445* (2013.01); *B60W 20/00* (2013.01); *B60W 2510/068* (2013.01); *B60W 2550/12* (2013.01); *F01N 9/00* (2013.01); *F01N 2240/16* (2013.01); *Y02T 10/54* (2013.01); *Y02T 10/6221* (2013.01); *Y02T 10/6286* (2013.01); *Y10T 477/23* (2015.01)

(58) Field of Classification Search
CPC  B60W 10/06; B60W 30/192; Y02T 10/6221; F01N 2240/16
USPC ................. 60/274, 284, 289, 285, 300; 477/3
See application file for complete search history.

(56) References Cited

U.S. PATENT DOCUMENTS

| | | | | |
|---|---|---|---|---|
| 5,323,868 | A  * | 6/1994 | Kawashima | 180/65.245 |
| 5,327,991 | A | 7/1994 | Yoshida | |
| 5,345,761 | A  * | 9/1994 | King et al. | 60/274 |
| 5,979,158 | A  * | 11/1999 | Kaiser et al. | 60/274 |
| 6,892,541 | B2 | 5/2005 | Suzuki | |
| 2008/0282686 | A1* | 11/2008 | Gonze et al. | 60/300 |
| 2009/0025371 | A1* | 1/2009 | Hermansson et al. | 60/286 |
| 2009/0293450 | A1* | 12/2009 | Gonze et al. | 60/274 |
| 2011/0283675 | A1* | 11/2011 | Gonze et al. | 60/274 |
| 2014/0190147 | A1* | 7/2014 | Roos et al. | 60/274 |

FOREIGN PATENT DOCUMENTS

| | | |
|---|---|---|
| DE | 19548120 | 1/1997 |
| EP | 0603907 | 6/1994 |
| JP | 4331402 | 11/1992 |
| JP | 10-089053 | 4/1998 |

OTHER PUBLICATIONS

Machine translation of JP 2008-239078A.*
Machine translation of DE19548120 [annotated by Examiner to include paragraph Numbers in brackets].*
PTO 12-4315 Boll, Wolf et al., Motor Pre-Heater for a Hybrid Vehicle, Jan. 16, 1997, Schreiber Translations for USPTO.*

* cited by examiner

Primary Examiner — Audrey K Bradley
Assistant Examiner — Jason Sheppard
(74) *Attorney, Agent, or Firm* — Gerald E. Hespos; Michael J. Porco; Matthew T. Hespos

(57) ABSTRACT

To improve the purification action of a catalytic converter that is being heated but has not yet reached a desired operating temperature, the internal combustion engine is driven by an electric machine to convey a flow of heating medium through a catalytic converter for heating purposes before the internal combustion engine is started.

6 Claims, 3 Drawing Sheets

METHOD FOR OPERATING A HYBRID DRIVE

CROSS-REFERENCE TO RELATED APPLICATIONS

This application claims priority under 35 USC 119 to German Patent Application No. 10 2008 063 449.2 filed on Dec. 17, 2008, the entire disclosure of which is incorporated herein by reference.

BACKGROUND OF THE INVENTION

1. Field of the Invention

The invention relates to a method for operating a hybrid drive having an internal combustion engine and an electric machine that can be coupled in terms of drive to the internal combustion engine, and having a heatable catalytic converter through which exhaust gas of the internal combustion engine flows.

2. Description of the Related Art

The U.S. Pat. No. 5,327,991 and JP 10089053 A disclose a hybrid vehicle having a catalytic converter that is pre-heated before the internal combustion engine is started.

It is an object of the invention to improve the purification action of the catalytic converter, in particular during starting of the internal combustion engine after a standstill.

SUMMARY OF THE INVENTION

The invention relates to a method for operating a hybrid drive having an internal combustion engine, an electric machine that can be coupled in terms of drive to the internal combustion engine and a heatable catalytic converter through which exhaust gas of the internal combustion engine flows. The catalytic converter has a cold phase in which the catalytic converter has not yet reached a desired operating temperature. The internal combustion engine is driven during the catalytic converter cold phase by the electric machine to convey a flow of heating medium through the catalytic converter for heating purposes before the internal combustion engine is started. The electric machine preferably comprises an electric motor. The electric machine alternatively or additionally may comprise a generator, such as a generator to enable stop-start operation of a hybrid vehicle. It is essential that, during the catalytic converter cold phase, the internal combustion engine is duly driven by the electric machine, but no combustion takes place in the internal combustion engine. The flow of heating medium initially is conveyed through the combustion chamber of the driven internal combustion engine and then through the catalytic converter. In this way, the heated catalytic converter can be brought up to the desired operating temperature more quickly and can immediately impart its full purification action during the subsequent start of combustion in the internal combustion engine. The flow of heating medium through the heated catalytic converter distributes heat more quickly and effectively in the heated catalytic converter.

The flow of heating medium preferably is heated during the catalytic converter cold phase by a heating device before being supplied to the catalytic converter or to a catalytic converter region to be heated. The heating device may be upstream of the catalytic converter or may be integrated in the catalytic converter. The heating device preferably is an electric heating device, such as a heatable disk.

The flow of heating medium preferably comprises air, which, in the catalytic converter cold phase, initially is sucked through the internal combustion engine and then fed through the heated catalytic converter for heating purposes. The flow of heating medium is preferably air and is sucked in through the driven internal combustion engine. In one essential aspect of the invention, no fuel is injected and no combustion takes place during the catalytic converter cold phase. The internal combustion engine preferably is operated only with air, in effect as an air pump or compressor during the catalytic converter cold phase.

The internal combustion engine preferably is driven by the electric machine with the catalytic converter simultaneously being heated, in at least one standstill phase of a motor vehicle that is fitted with the hybrid drive. In the standstill phase, the motor vehicle is stationary and not moving. Driving the internal combustion engine in the standstill phase has the advantage that the drive energy provided by the electric machine for driving the motor vehicle is not required. Once the motor vehicle is set in motion by the electric machine, the drive of the internal combustion engine by the electric machine can be ended.

The method preferably is characterized in that the internal combustion engine is driven by the electric machine, with the catalytic converter simultaneously being heated, before an electric machine driving phase. Heating of the catalytic converter according to the invention is ended when the drive power of the electric machine is required for the traction drive of the motor vehicle.

The internal combustion engine preferably is driven by the electric machine in a further standstill phase after the electric machine driving phase. Heating of the catalytic converter according to the invention may be resumed when the drive energy of the electric machine is no longer required for the traction drive of the motor vehicle.

The internal combustion engine preferably is driven by the electric machine, with the catalytic converter simultaneously being heated, in the electric machine driving phase. A part of the drive energy can be used to drive the internal combustion engine to heat the catalytic converter if not all of the drive energy of the electric machine is required for the traction drive of the motor vehicle.

The internal combustion engine preferably is driven by the electric machine with the catalytic converter simultaneously being heated in a recuperation phase. In the recuperation phase, the converted drive energy of the electric machine can be used particularly effectively for heating the catalytic converter.

The combustion of the internal combustion engine preferably is not started after the ignition of the internal combustion engine is switched on, but rather the internal combustion engine is driven by the electric machine without fuel being injected. Combustion in the internal combustion engine preferably is started only when the catalytic converter has reached the desired operating temperature. For this purpose, the temperature of the catalytic converter may be monitored. However the catalytic converter also may be heated over a predefined time period.

Combustion in the internal combustion engine preferably is started only when the catalytic converter has reached the desired operating temperature. In this connection, it may be expedient to monitor the air mass, the ambient temperature and the temperature in the combustion chamber of the internal combustion engine. The combustion in the internal combustion engine may be started according to a start enable signal by means of a corresponding control device.

DETAILED DESCRIPTION OF THE PREFERRED EMBODIMENTS

The invention relates to a method for operating a hybrid motor vehicle having an internal combustion engine and an electric machine coupled thereto or a vehicle with automatic start-stop functionality. An electrically heatable exhaust-gas catalytic converter communicates with the internal combustion engine. More particularly, an electric heating disk is positioned upstream of the exhaust-gas catalytic converter.

By means of the electric heating disk, it is possible for the catalytic converter to be heated after a relatively long standstill period of the motor vehicle. However, the heating process lasts a relatively long time. According to one significant aspect of the present invention, the internal combustion engine is driven by the electric machine, with the catalytic converter simultaneously being heated, in a so-called catalytic converter cold phase in which the catalytic converter has not yet reached a desired operating temperature. Here, the internal combustion engine is not supplied with fuel, that is to say no combustion takes place.

By virtue of the internal combustion engine being driven, or turned over, by the electric machine, the internal combustion engine acts as a compressor and supplies the catalytic converter, which is arranged at the exhaust-gas side of the internal combustion engine, with a flow of heating medium, preferably with an air flow, which is heated by the heating disk. In this way, the catalytic converter can be brought up to the desired operating temperature considerably more quickly than is possible with only an electric heating device, such as the heating disk. The method according to the invention is preferably used before the first start of the internal combustion engine after a relatively long standstill period of the motor vehicle in order to bring the cold catalytic converter up to the desired operating temperature more quickly. This is achieved by virtue of the catalytic converter imparting its optimum purification action immediately upon commencement of the combustion process in the internal combustion engine.

Figure 1:
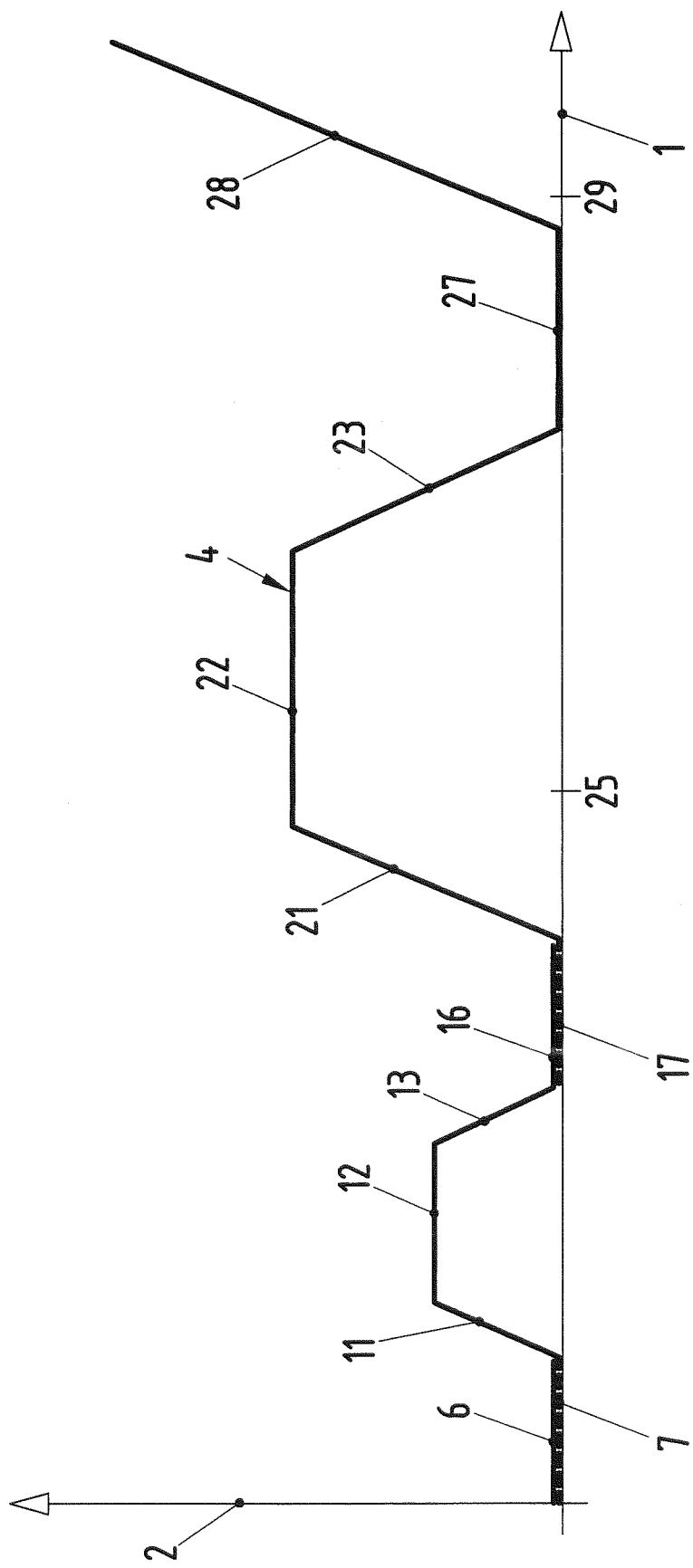
FIGS. 1 to 3 illustrate examples of different strategies by which a hybrid vehicle can be operated using the method of the invention.
Figure 2:
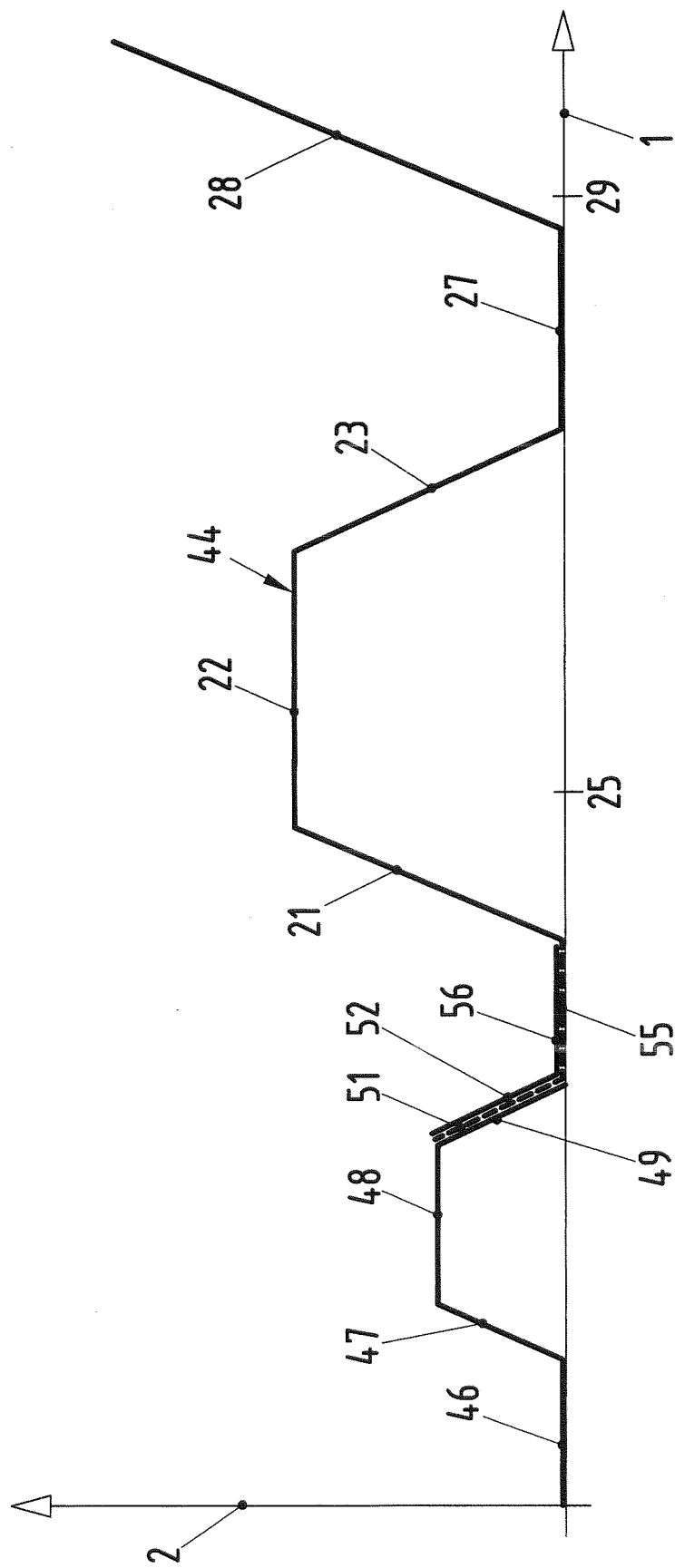
Figure 3:
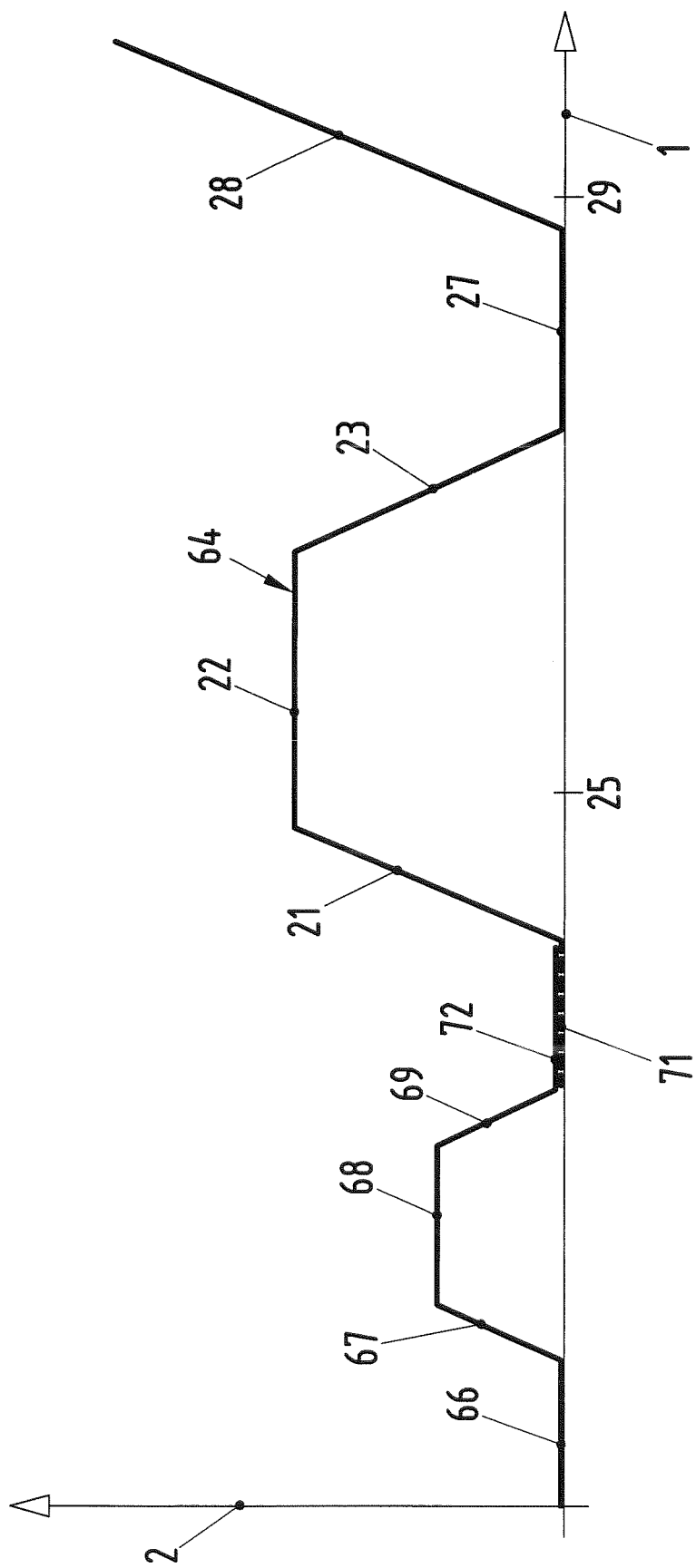

FIGS. 1 to 3 illustrate, in each case in a Cartesian coordinate diagram with an X-axis 1 and a Y-axis 2, different strategies by which a hybrid drive or a hybrid vehicle having a hybrid drive can be operated using the method of the invention. The time, for example in seconds, is plotted on the X-axis 1. The speed of the hybrid vehicle, for example in kilometers per hour, is plotted on the Y-axis 2.

FIG. 1 illustrates, on the basis of a characteristic curve 4, a first exemplary embodiment of how the method of the invention can be used in a hybrid vehicle having an internal combustion engine, an electric machine and a heatable catalytic converter. The horizontal line 6 represents the heating of the catalytic converter being active after a relatively long standstill period of the hybrid vehicle.

The dashed horizontal line 7 represents the internal combustion engine being driven or turned over by the electric machine in the illustrated time period. The rising line 11 represents the hybrid vehicle being set in motion by the electric machine. The horizontal line 12 represents the vehicle traveling relatively slowly, driven by the electric machine. The falling line 13 represents the speed of driving with the electric machine being decreased to a standstill.

The horizontal line 16 represents the catalytic converter being heated again when the hybrid vehicle is at a standstill. The dashed horizontal line 17 represents the internal combustion engine again being driven, and turned over, by the electric machine in the time period. The simultaneous driving of the internal combustion engine and heating of the catalytic converter when the hybrid vehicle is at a standstill enables the catalytic converter to be heated particularly quickly and effectively before the combustion process in the internal combustion engine is started.

The rising line 21 represents the combustion process in the internal combustion engine being started to accelerate the hybrid vehicle to an increased speed. When the increased speed is reached, the combustion process in the internal combustion engine can be ended again, for example at a time 25, and driving can be continued using the electric machine, as represented by the horizontal line 22.

The falling line 23 represents the speed of driving with the electric machine being decreased to a standstill. The horizontal line 27 represents the hybrid vehicle being at a standstill without the heating of the catalytic converter being active and without the internal combustion engine being driven by the electric machine.

The rising line 28 represents the hybrid vehicle being accelerated by the electric machine up to a time 29, and thereafter being accelerated by the internal combustion engine. In the exemplary embodiment illustrated in FIG. 1, the catalytic converter is heated in two standstill phases 6, 16, with the internal combustion engine being simultaneously driven by the electric machine, as represented by the dashed lines 7, 17.

FIGS. 2 and 3 illustrate coordinate diagrams that are similar to FIG. 1. The same reference symbols are used to denote the coordinate axes and identical phases. To avoid repetition, reference is made to the above description of FIG. 1. Primarily the differences between the illustrated exemplary embodiments are discussed below.

The characteristic curve 44 of FIG. 2 illustrates a second exemplary embodiment of how the method of the invention can be used for operating a hybrid vehicle. The horizontal line 46 represents the electric machine being active after a relatively long standstill period. The rising line 47 represents the hybrid vehicle being accelerated by the electric machine. The horizontal line 48 represents the hybrid vehicle, driven by the electric machine, traveling relatively slowly.

The falling line 49 represents the driving speed of the hybrid vehicle being decreased in a recuperation phase. During recuperation, negative acceleration energy is converted into electrical energy in the electric machine, in particular in a generator. The dashed line 51 represents the internal combustion engine being driven by the electric machine in the recuperation phase. The falling line 52 represents the heating of the catalytic converter being active. The dashed horizontal line 55 represents the heating of the catalytic converter remaining active even when the hybrid vehicle is at a standstill. The horizontal line 56 represents the internal combustion engine being driven by the electric machine even when the hybrid vehicle is at a standstill.

The rising line 21 represents, as in the preceding embodiment, the internal combustion engine being started when the catalytic converter has reached the desired operating temperature. In the embodiment of FIG. 2, therefore, the catalytic converter is heated using the method of the invention during the recuperation phase and in the second standstill phase.

The characteristic curve 64 of FIG. 3 illustrates a further exemplary embodiment of how the method of the invention can be used to operate a hybrid vehicle. More particularly, a horizontal line 66, a rising line 67, a further horizontal line 68 and a falling line 69 represent the hybrid vehicle being accelerated from a standstill to a relatively low speed by the electric machine and then braked again.

The dashed line 71 represents the heating of the catalytic converter becoming active or being active in a second standstill phase of the hybrid vehicle. The horizontal line 72 represents the internal combustion engine being driven by the electric machine in the second standstill phase. When the catalytic converter has reached the desired operating temperature, the combustion process in the internal combustion engine is started, as represented by the rising line 21. In the exemplary embodiment illustrated in FIG. 3, the heating of the catalytic converter takes place only in the second standstill phase of the hybrid vehicle.

What is claimed is:

1. A method for operating a hybrid drive having an internal combustion engine and having an electric machine that can be coupled in terms of drive to the internal combustion engine, and having a heatable catalytic converter through which exhaust gas of the internal combustion engine flows, the method comprising:
    starting the electric machine;
    measuring a temperature at the catalytic converter;
    using the electric machine to operate an electric heater upstream of the catalytic converter while operating the electric machine to drive the internal combustion engine without fuel injection and without combustion in a catalytic converter cold phase in which the catalytic converter has not yet reached a desired operating temperature so that the electric machine causes the internal combustion engine to pump a flow of air without fuel through the internal combustion engine without having the internal combustion engine heat the air;
    directing the flow of air from the internal combustion engine to the electric heater;
    heating the air at the electric heater and pumping a flow of heated air to the catalytic converter for heating the catalytic converter before the internal combustion engine is started;
    using the electric machine in a driving phase and simultaneously stopping operation of the electric heater upstream of the catalytic converter and stopping operation of the electric machine to drive the internal combustion engine without combustion in the electric machine driving phase;
    again using the electric machine for driving the internal combustion engine without fuel injection and without combustion and heating the catalytic converter during each subsequent standstill phase or during any recuperation phase if the catalytic converter is not at the desired operating temperature; and
    stopping operation of the electric heater and stopping operation of the electric machine to drive the internal combustion engine without combustion during each subsequent electric machine driving phase.

2. The method of claim 1, wherein the step of starting the electric machine comprises switching the ignition of the internal combustion engine on and driving the internal combustion engine by the electric machine without fuel being injected.

3. The method of claim 2, further comprising starting combustion in the internal combustion engine only when the catalytic converter has reached the desired operating temperature.

4. A method for operating a hybrid drive of a hybrid vehicle having an internal combustion engine and having an electric machine that can be coupled in terms of drive to the internal combustion engine, and having a heatable catalytic converter through which exhaust gas of the internal combustion engine flows, the method comprising:
    turning on an ignition switch for the vehicle;
    measuring a temperature of the catalytic converter;
    using the electric machine to operate an electric heater downstream of the internal combustion engine and upstream of the catalytic converter if the temperature indicates that catalytic converter is in cold phase in which the catalytic converter has not yet reached a desired operating temperature;
    operating the electric machine to drive the internal combustion engine during the catalytic converter cold phase without injecting fuel to the engine for conveying a flow of air from the internal combustion engine without having the internal combustion engine heat the air, directing the flow of air from the internal combustion engine to the electric heater, heating the air at the electric heater and pumping a flow of heated air through the catalytic converter for heating the catalytic converter before starting the internal combustion engine;
    using the electric machine to set the vehicle in motion and simultaneously stopping operation of the electric heater upstream of the catalytic converter and stopping operation of the electric machine to drive the internal combustion engine without combustion in an electric machine driving phase;
    again using the electric machine for driving the internal combustion engine without fuel injection and without combustion and heating the catalytic converter in a subsequent standstill phase or in a recuperation phase if the catalytic converter is not at the desired operating temperature; and
    stopping operation of the electric heater and stopping operation of the electric machine to drive the internal combustion engine without combustion during each subsequent time that the vehicle is set in motion by at least one of the electric machine and the internal combustion engine.

5. The method of claim 4, further comprising injecting fuel to the internal combustion engine and starting the internal combustion engine after the catalytic converter has reached the desired operating temperature.

6. The method of claim 5, further comprising terminating the use of the electric machine to operate the heater and terminating the operation of the electric machine to drive to the internal combustion engine after the catalytic converter has reached the desired operating temperature.

* * * * *